(No Model.)
G. W. LUTZ & J. M. DILLON.
APPARATUS FOR TESTING PIPES.
No. 382,266. Patented May 1, 1888.
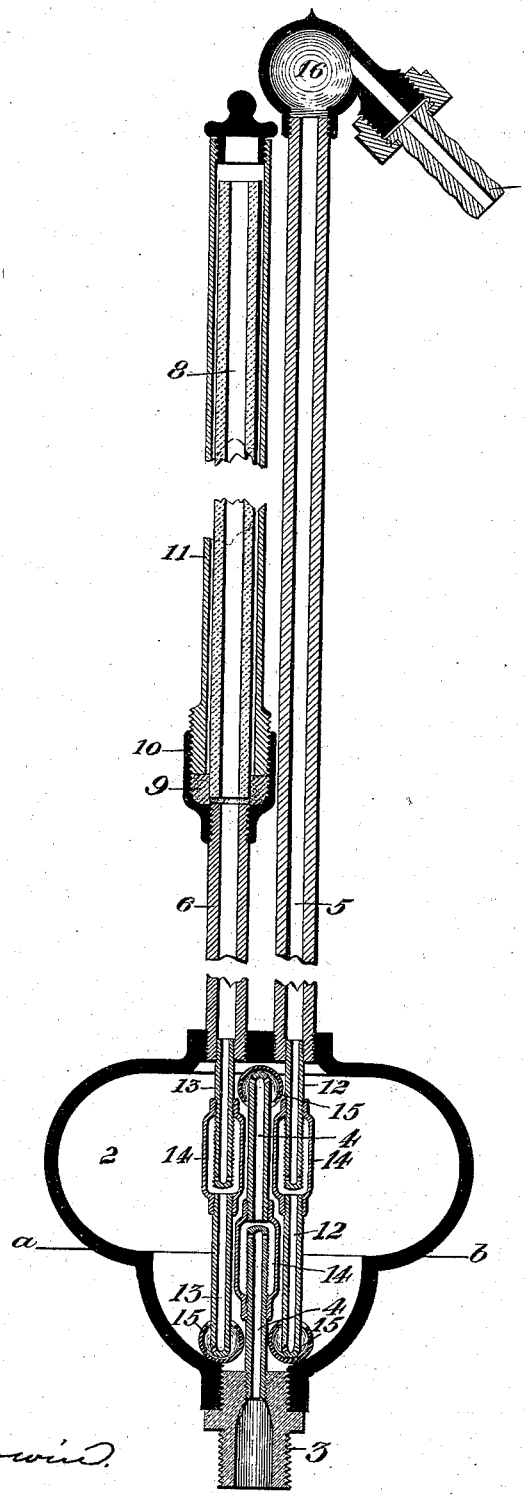
Witnesses.
H. L. Gill.
N. B. Corwin.
Inventors.
George W. Lutz.
James M. Dillon.
by W. Bakewell & Sons
their Attorneys.

UNITED STATES PATENT OFFICE.

GEORGE W. LUTZ AND JAMES M. DILLON, OF WHEELING, WEST VIRGINIA; SAID DILLON ASSIGNOR, BY MESNE ASSIGNMENTS, TO JOHN S. TRIMBLE, OF SAME PLACE.

APPARATUS FOR TESTING PIPES.

SPECIFICATION forming part of Letters Patent No. 382,266, dated May 1, 1888.

Application filed January 10, 1888. Serial No. 260,322. (No model.)

*To all whom it may concern:*

Be it known that we, GEORGE W. LUTZ and JAMES M. DILLON, both of Wheeling, in the county of Ohio and State of West Virginia, have invented a new and useful Improvement in Apparatus for Testing Pipes; and we do hereby declare the following to be a full, clear, and exact description thereof.

Our invention relates to an improvement in that class of instruments for testing gas-pipes, &c., in which a certain pressure of air is forced into the pipes and a glass tube immersed in a vessel containing mercury is connected with the pipes, so that the compressed air shall raise and sustain a mercury column in the tube. The soundness of the pipe fitting is then tested by observing the mercury, which remains stationary if the pipes are perfectly secure, but sinks if there is any leak in the pipes through which air may escape. A practical difficulty which has always been experienced in the use of these instruments is the liability of the mercury to spill and to waste. So long as the instrument is held in a perfectly upright position the liquid, of course, cannot spill; but it cannot be turned upside down or laid on its side without spilling the contents, and there is danger of this even in carrying the instrument from place to place. The consequence is that, instead of keeping the instrument constantly filled with mercury, as it ought to be, it must be recharged on each occasion of its use and emptied when it is not used. The workman must therefore carry the mercury about with him in a bottle, and he is continually liable to mislay or to spill it. Besides this, the repeated unscrewing of the parts necessary to fill the instrument with mercury is apt very soon to make them loose and to cause them to leak air, and this, of course, spoils the instrument for practical use.

One of the objects of our invention is to provide a testing-instrument which shall be equally as effective as those heretofore in use and which can be kept charged with mercury and held in any position without danger of spilling or wasting its contents. It is, however, the principal object of our invention to provide a testing-instrument which can be used without any valves for cutting off connection between the instrument and the air force-pump. These valves, besides their expense, are inconvenient on account of their liability to become loose and to leak air, thus spoiling the efficiency of the instrument.

We shall now describe our invention with reference to the accompanying drawing, which represents a longitudinal central section of a testing-instrument constructed according to the principles of our invention.

In the drawing, 2 represents the closed vessel or chamber which contains the mercury or other testing-fluid. At the lower end of the chamber it is provided with a screw-nozzle, 3, which affords means for connecting the instrument with the system of pipes to be tested, and from this nozzle a tube, 4, extends into the chamber 2 to or nearly to the opposite side thereof. At the other side of the chamber 2 are fitted tubes 5 and 6, the tube 5 having at its outer end a nozzle, 7, forming means for connection of the tube with an air-forcing pump. The tube 6 is the indicating-tube, and may be made entirely of glass; but for the purpose of economy and to diminish its liability to break we prefer to make it partly of metal and partly of glass, the lower part being metal and the upper part, 8, being made of glass and connected with the lower part, 6, by means of packing 9, fitted in a suitable coupling-box, 10. The glass tube 8 is open at its upper end and is partially inclosed by a protecting shield or case, 11. The tubes 5 and 6 are provided with extensions 12 and 13, which extend into the chamber 2 toward the opposite sides thereof. The tubes 4, 12, and 13 are preferably not simple unbroken tubes, but, for purposes which we will hereinafter explain, are parted, and are provided with couplings 14, connecting the parts and constituting traps.

The operation of the instrument is as follows: The chamber 2 is charged with a proper quantity of mercury, standing, say, at the level of the line *a b* when the instrument is in an upright position, as shown in the drawing. Then, to test the system of pipes, the nozzle 3 is connected with the pipes by means of a suitable connection, and the nozzle 7 at the upper end of the tube 5 is connected with an air force-pump. Air is forced from this pump through the tube 5 into the chamber 2, displacing the mercury in the tube until the proper pressure has been created within the chamber, and within the system of pipes which communicates with the chamber by means of the tube 4. The effect of this compressed air in the chamber 2, acting on the surface of the mercury, is to elevate a column of mercury in the tube 8. The air-pump is now disconnected from the nozzle 7, so as to leave the upper end of the tube 5 in free communication with the atmosphere. The effect of this is not to allow the air to escape from the chamber 2, but the compressed air in the chamber, acting on the surface of the mercury, causes the mercury to rise within the tube 5 and to establish a column therein of the same height as the mercury column in the glass tube 8. The instrument thus seals itself and prevents the escape of air without the use of valves of any kind. The operator tests the security of the pipes by observing the mercury column in the tube 8. If the column remains stationary, he knows that the pipes are sound, but if it falls it indicates the presence of a leak.

The advantages of this instrument are its simplicity, the fact that there are no valves or other parts to screw or unscrew and to render the instrument liable to leak air, and the fact that it can be held in any position without spilling its liquid contents. Thus, when the instrument is in the position shown in the drawing, the lower ends of the tubes 12 and 13 are in the mercury and the upper end of the tube 4 is above the level of the mercury, and there is no free outlet afforded for the mercury, and if the instrument be placed on its side the remoteness of the sides of the chamber 2 from the tubes 4, 12, and 13 is such that these tubes are then above the level of the mercury and afford no outlet for it. So, if the instrument be inverted, it is obvious that the mercury cannot escape.

In order to prevent the inversion of the instrument from allowing the small quantity of liquid standing in the tubes within the chamber from spilling, we provide them with the traps 14, before described; and as a still further security against the splashing of the mercury into the mouths of the tubes we provide them with caps 15. When the mercury rises within the tube 5, after the disconnection of the air-pump, it will of course ascend with some velocity, and its impetus might be sufficient to cause the discharge of some of the mercury out of the upper end of the tube.

In order to prevent this, we provide the tube at its upper end with an enlargement or ball, 16, and connect the nozzle 7 with this ball at a point not directly opposite the mouth of the tube 5. Any mercury which may rush up through the tube 5 into the ball 16 will fall back again without escaping through the nozzle 7. By the use of this enlargement we attain the desired result without making the tube 5 of undue length, as would otherwise be necessary.

We do not intend to claim, broadly, herein the arrangement of the tubes 4 and 13 so that their mouths shall be at different sides of the chamber 2 for the purpose of preventing spilling the contents of the chamber, since that is the separate invention of George W. Lutz, and is embodied in another application for Letters Patent filed herewith. Our present invention consists in the use of the tube affording connection with the air-pump and extending into the liquid-chamber 2 for the purpose of closing communication between the tube and the chamber 2 without the use of any valves. We intend, therefore, to cover this feature broadly, without limitation by the position or arrangement of the tube 5 or by the arrangement of the other tubes, since for the purpose of this feature of our invention the other tubes and their connection with the chamber 2 may be arranged in any desired manner.

As the most convenient means of practicing our invention, we prefer to use the two tubes 5 and 6, both extending into the liquid, one being used for the purpose of affording a channel for the admission of compressed air and the other serving as an indicating-tube for showing the degree of air-pressure. Obviously, however, the instrument may be used without the tube 6 by making the tube 5 either partially or wholly of glass and causing it to serve both the functions above indicated. In this case, in order that the operator may know when sufficient air has been compressed into the pipes and into the chamber 2, it would be desirable to employ some sort of pressure-gage, mercurial or otherwise, connected with the air-pump or with the testing-instrument. If desired, also, if both tubes be used and for convenience of arrangement, the tube 5 may be placed inside of the other tube. All such modifications we desire to include within the scope of the following claims.

Besides the advantages which we have indicated above, our improved instrument possesses many other good features, which will be appreciated by those skilled in the art.

We claim—

1. In an instrument for testing pipes, &c., wherein a vessel containing liquid and provided with an indicating-tube is connected with the pipes to be tested and with an air-compressing apparatus, the combination, with the said vessel, of the air-supply tube, the mouth of the said tube extending into the liquid, substantially as and for the purposes described.

2. In an instrument for testing pipes, &c., wherein a vessel containing liquid and provided with an indicating-tube is connected with the pipes to be tested and with an air-compressing apparatus, the combination, with the said vessel, of the air-supply tube, the mouth of the said tube extending into the liquid, and said tube having an enlargement to prevent overflow of the liquid from the tube, substantially as and for the purposes described.

In testimony whereof we have hereunto set our hands this 7th day of January, A. D. 1888.

GEORGE W. LUTZ.
JAMES M. DILLON.

Witnesses:
GEO. STRAEHNAR,
PAUL PORTER.